(12) United States Patent
Chung et al.

(10) Patent No.: US 12,021,230 B2
(45) Date of Patent: Jun. 25, 2024

(54) ANODE ACTIVE MATERIAL FOR LITHIUM SECONDARY BATTERY AND LITHIUM SECONDARY BATTERY INCLUDING THE SAME

(71) Applicant: SK On Co., Ltd., Seoul (KR)

(72) Inventors: Ju Ho Chung, Daejeon (KR); Gwi Ok Park, Daejeon (KR); Joon Sup Kim, Daejeon (KR); Eun Jun Park, Daejeon (KR); Dong Il Jang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 167 days.

(21) Appl. No.: 17/495,876

(22) Filed: Oct. 7, 2021

(65) Prior Publication Data

US 2022/0263081 A1 Aug. 18, 2022

(30) Foreign Application Priority Data

Feb. 18, 2021 (KR) .................. 10-2021-0021718

(51) Int. Cl.
*H01M 4/38* (2006.01)
*H01M 4/04* (2006.01)
*H01M 4/583* (2010.01)
*H01M 10/0525* (2010.01)

(52) U.S. Cl.
CPC ......... *H01M 4/386* (2013.01); *H01M 4/0471* (2013.01); *H01M 4/583* (2013.01); *H01M 10/0525* (2013.01)

(58) Field of Classification Search
CPC .... H01M 4/386; H01M 4/366; H01M 4/0428; H01M 4/0471; H01M 4/583; H01M 10/0525
See application file for complete search history.

(56) References Cited

U.S. PATENT DOCUMENTS

| 10,622,626 B2 | 4/2020 | Kawada |
| 2011/0244333 A1 | 10/2011 | Kawada |
| 2014/0170485 A1 | 6/2014 | Lee et al. |
| 2015/0325848 A1 | 11/2015 | Yamashita et al. |
| 2017/0040610 A1 | 2/2017 | Otsuka et al. |
| 2017/0149050 A1* | 5/2017 | Hirose .................. H01M 4/131 |
| 2019/0319261 A1 | 10/2019 | Uchiyama et al. |
| 2020/0058924 A1 | 2/2020 | Pang et al. |

FOREIGN PATENT DOCUMENTS

| JP | 6302322 B2 | 3/2018 |
| KR | 1020130045212 A | 5/2013 |
| KR | 1020150112746 A | 10/2015 |
| KR | 1020150128592 A | 11/2015 |
| KR | 1020160104720 A | 9/2016 |
| KR | 1020160126017 A | 11/2016 |
| KR | 1020170023832 A | 3/2017 |
| KR | 101728171 B1 | 4/2017 |
| KR | 101783047 B1 | 9/2017 |
| KR | 1020180103594 A | 9/2018 |
| KR | 1020190040318 A | 4/2019 |
| KR | 1020210003698 A | 1/2021 |
| WO | 2014007161 A1 | 1/2014 |
| WO | 2018101072 A1 | 6/2018 |

OTHER PUBLICATIONS

Wu et al., "Recycling silicon-based industrial waste as sustainable sources of Si/SiO2 composites for high-performance Li-ion battery anodes", Journal of Power Sources, 2020, pp. 1-7, vol. 449, No. 227513.

* cited by examiner

*Primary Examiner* — Sarah A. Slifka
(74) *Attorney, Agent, or Firm* — The Webb Law Firm

(57) ABSTRACT

Provided is a lithium secondary battery including a silicon-based anode active material for a lithium secondary battery and an anode formed using the same. The silicon-based anode active material for a lithium secondary battery according to exemplary embodiments includes a surface coated with carbon and doped with lithium. A ratio of a peak area at 102.5 eV to a total area of a peak area at 100 eV, the peak area at 102.5 eV, and a peak area at 104 eV, which appear in an Si2p spectrum when measuring by X-ray photoelectron spectroscopy (XPS), is 40% or less, thereby allowing an electrode to be stably manufactured without changing physical properties of the slurry during manufacturing the electrode. In addition, the anode active material for a secondary battery may be usefully used to manufacture a lithium secondary battery having high discharge capacity and high energy density characteristics.

6 Claims, 2 Drawing Sheets

001,230 B2

ANODE ACTIVE MATERIAL FOR LITHIUM SECONDARY BATTERY AND LITHIUM SECONDARY BATTERY INCLUDING THE SAME

CROSS-REFERENCE TO RELATED APPLICATIONS

This application claims priority to Korean Patent Application No. 10-2021-0021718 filed Feb. 18, 2021, the disclosure of which is hereby incorporated by reference in its entirety.

BACKGROUND OF THE INVENTION

1. Field of the Invention

The present invention relates to a silicon-based anode active material for a lithium secondary battery and a lithium secondary battery including an anode formed using the same.

2. Description of the Related Art

A secondary battery is a battery that can be repeatedly charged and discharged, and is widely applied as a power source for portable electronic communication devices such as camcorders, mobile phones, and notebook PCs with the development of information communication and display industries. Also, recently, a battery pack including a secondary battery has been developed and applied as a power source for an eco-friendly vehicle such as a hybrid vehicle.

Examples of the secondary battery may include a lithium secondary battery, a nickel-cadmium battery, a nickel-hydrogen battery and the like. Among them, the lithium secondary battery has a high operating voltage and a high energy density per unit weight, and is advantageous in terms of a charging speed and light weight. In this regard, the lithium secondary battery has been actively developed and applied as a power source.

For example, the lithium secondary battery may include: an electrode assembly including a cathode, an anode, and a separation membrane (separator); and an electrolyte in which the electrode assembly is impregnated. The lithium secondary battery may further include, for example, a pouch-shaped outer case in which the electrode assembly and the electrolyte are housed.

Recently, as subjects, to which the lithium secondary battery is applied, are expanded, development for a lithium secondary battery having a higher capacity and output has been proceeded. For example, cathode or anode materials capable of providing higher capacity have been studied.

For example, Korean Patent Registration No. 10-1728171 discloses a method of manufacturing a negative electrode material for a non-aqueous electrolyte secondary battery, which includes coating a surface of a powder composed of silicon oxide and a silicon-silicon oxide composite with carbon, and then doping the surface with lithium. However, when coating a surface of an anode active material with carbon followed by doping with lithium, residual lithium is present on the surface, which causes an increase in pH and shrinkage of a thickener during a slurry preparation process, and thereby it is difficult to manufacture an electrode due to these phenomena.

PRIOR ART DOCUMENT

Patent Document

Korean Patent Registration Publication No. 10-1728171

SUMMARY OF THE INVENTION

One object of the present invention is to provide a silicon-based anode active material for a lithium secondary battery, which has excellent stability and uniformity during manufacturing an electrode, and may provide excellent chemical stability and operational reliability to the lithium secondary battery.

In addition, another object of the present invention is to provide a lithium secondary battery including an anode manufactured using the silicon-based anode active material for a lithium secondary battery.

Further, another object of the present invention is to provide a method of manufacturing the silicon-based anode active material for a lithium secondary battery.

According to an aspect of the present invention, there is provided a silicon-based anode active material for a lithium secondary battery including a surface coated with carbon and doped with lithium, wherein a ratio of a peak area at 102.5 eV to a total area of a peak area at 100 eV, the peak area at 102.5 eV, and a peak area at 104 eV, which appear in an Si2p spectrum when measuring by X-ray photoelectron spectroscopy (XPS), is 40% or less.

In some embodiments, the carbon may be coated in an amount of 2.0 to 5.0% by weight based on a total weight of the silicon-based anode active material.

In some embodiments, the lithium may be doped in an amount of 3.5 to 9.5% by weight based on a total weight of the silicon-based anode active material.

In some embodiments, the silicon-based anode active material may have a silicon crystal grain size of 20 nm or less.

In some embodiments, the silicon-based anode active material may include SiOX (x=0.8 to 1.2).

In addition, according to another aspect of the present invention, there is provided lithium secondary battery including: a cathode; an anode including the silicon-based anode active material for a lithium secondary battery; and a separation membrane interposed between the cathode and the anode.

Further, according to another aspect of the present invention, there is provided a method of manufacturing a silicon-based anode active material for a lithium secondary battery including: coating a surface of the silicon-based anode active material powder with carbon; mixing the silicon-based anode active material having the surface coated with carbon and a lithium-containing compound, and heating the mixture to 600 to 700° C., followed by doping with lithium; and washing the silicon-based anode active material doped with lithium by a solvent.

In some embodiments, the carbon may be coated in an amount of 2.0 to 5.0% by weight based on a total weight of the silicon-based anode active material.

In some embodiments, the lithium-containing compound may be any one or more selected from the group consisting of lithium (Li) metal, lithium hydride (LiH), lithium hydroxide (LiOH), lithium carbonate ($Li_2CO_3$), and lithium naphthalenide.

In some embodiments, the lithium may be doped in an amount of 3.5 to 9.5% by weight based on a total weight of the silicon-based anode active material.

The silicon-based anode active material for a lithium secondary battery according to exemplary embodiments includes a surface coated with carbon and doped with lithium, wherein a ratio of a peak area at 102.5 eV to a total area of a peak area at 100 eV, the peak area at 102.5 eV, and a peak area at 104 eV, which appear in an Si2p spectrum when measuring by X-ray photoelectron spectroscopy (XPS), is 40% or less, thereby allowing an electrode to be stably manufactured without changing physical properties of the slurry during manufacturing the electrode. In addition, the anode active material for a secondary battery may be usefully used to manufacture a lithium secondary battery having high discharge capacity and high energy density characteristics.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE INVENTION

Figure 1A:
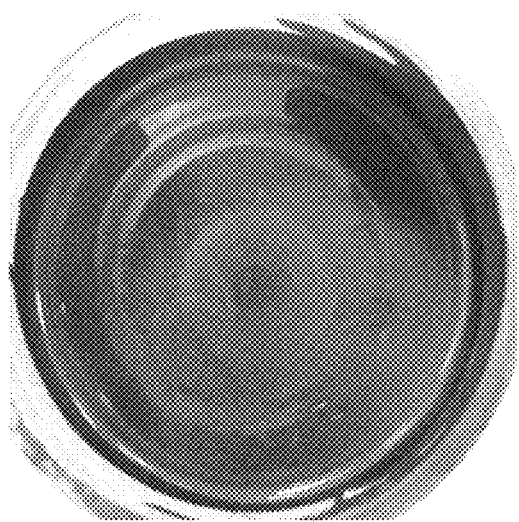
FIGS. 1(a) and 1(b) are photographs showing a slurry including a silicon-based anode active material according to exemplary embodiments.

According to embodiments of the present invention, a silicon-based anode active material for a lithium secondary battery is provided, which includes a surface coated with carbon and doped with lithium, wherein a ratio of a peak area at 102.5 eV to a total area of a peak area at 100 eV, the peak area at 102.5 eV, and a peak area at 104 eV, which appear in an Si2p spectrum when measuring by X-ray photoelectron spectroscopy (XPS), is 40% or less.

In addition, embodiments according to the present invention provide a lithium secondary battery including: a cathode; an anode including the silicon-based anode active material for a lithium secondary battery; and a separation membrane interposed between the cathode and the anode.

Further, embodiments according to the present invention provide a method of manufacturing an anode active material for a lithium secondary battery, which includes: coating a surface of a silicon-based active material powder with carbon; mixing the silicon-based anode active material having the surface coated with carbon and a lithium-containing compound, and then heating the mixture to 600 to 700° C., followed by doping with lithium; and washing the silicon-based anode active material doped with lithium by a solvent.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

<Silicon-Based Anode Active Material for Lithium Secondary Battery>

The silicon-based anode active material for a lithium secondary battery (hereinafter, may be abbreviated as a silicon-based anode active material) according to embodiments of the present invention may include a silicon-based anode active material having a surface coated with carbon and doped with lithium.

In the silicon-based anode active material for a lithium secondary battery according to some embodiments, it is preferable that a ratio of a peak area at 102.5 eV (hereinafter, may be abbreviated as a 102.5 eV peak area ratio) to a total area of a peak area at 100 eV ('100 eV peak area'), the peak area at 102.5 eV ('102.5 eV peak area'), and a peak area at 104 eV ('104 eV peak area'), which appear in an Si2p spectrum when measuring by X-ray photoelectron spectroscopy (XPS), satisfies a range of 40% or less.

When the 102.5 eV peak area ratio exceeds 40%, hydrogen gases are generated during preparation of a slurry to cause a change in physical properties of the slurry, which is disadvantageous in terms of manufacturing a uniform anode, and also results in a deterioration in electrical properties such capacity characteristics, charge/discharge and life-span characteristics, and the like of the manufactured anode.

In some embodiments, the carbon coating may be formed by thermal decomposition of an organic material when the organic material is subjected to heat treatment under a non-oxidizing atmosphere.

In some embodiments, the carbon coating may be formed by performing thermal CVD treatment on the surface of the silicon-based active material powder with the organic material at 800 to 1,000° C. under an atmosphere of gas and/or vapor. When the temperature in the thermal CVD treatment is less than 800° C., crystallization of carbon on the surface of the silicon-based active material powder is not sufficiently achieved, such that the carbon coating may not be reliably formed on the surface of the silicon-based active material powder. When the temperature exceeds 1,000° C., a silicon crystal grain size of the silicon-based active material is increased to 20 nm or more, and thus the life-span characteristics of the battery may be deteriorated. The silicon crystal grain size may be calculated from full width at half maximum (FWHM) of a silicon peak measured at 2θ of 28.5°, 47.5°, and 56.0° after measuring the silicon-based anode active material by XRD (X-ray diffraction, Cu anode source).

The organic material may be a single or mixture of hydrocarbons such as methane, ethane, ethylene, acetylene, propane, butane, butene, pentane, isobutane, hexane, cyclohexane, etc.; monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, phenanthrene, or a mixture thereof, etc. In addition, gas light oil, creosote oil, anthracene oil, and tar oil produced by naphtha cracking, which are obtained in a tar distillation process, may also be used alone or as a mixture.

In some embodiments, the carbon coating may be formed in an amount of 2.0 to 5.0% by weight ('wt. %') based on a total weight of the silicon-based anode active material, preferably 2.5 to 5.0 wt. %, and more preferably 3.0 to 5.0 wt. %. When the carbon coating is formed within the above range, it is possible to impart appropriate conductivity to the silicon-based anode active material.

Further, the powder after carbon coating is doped with lithium. In exemplary embodiments, lithium doping may be performed by mixing the silicon-based anode active material having the surface coated with carbon and a lithium-containing compound, and then heating the mixture to 600 to 700° C. The lithium-containing compound may be any one or more selected from the group consisting of lithium (Li) metal, lithium hydride (LiH), lithium hydroxide (LiOH), lithium carbonate (Li$_2$CO$_3$), and lithium naphthalenide. The mixing is not particularly limited, but may be performed by using a mixing device such as a tumbler mixer under an inert atmosphere. Thereafter, by performing doping at a temperature of 600 to 700° C., lithium doping may be performed sufficiently, and by preventing the silicon crystal from being increased larger than necessary, a deterioration in the capacity characteristics or a decrease in the cycle life-span of the anode may be prevented.

In some embodiments, the lithium doping may be performed in an amount of 3.5 to 9.5 wt. % based on the total weight of the silicon-based anode active material, preferably 3.7 to 8.0 wt. %, and more preferably 4.0 to 7.0 wt. %. When the doping amount is less than 9.5 wt. %, energy density of the silicon-based anode active material is reduced, thereby causing a deterioration in operation efficiency of the lithium secondary battery. When the doping amount exceeds 9.5 wt. %, gases may be generated in an excessive amount, thereby causing a deterioration in quality of the electrode during preparation of a slurry.

In particular, when the 102.5 eV peak area ratio satisfies the range of 40% or less, an anode active material having a carbon coating amount of 3.0 to 5.0 wt. % based on the total weight of the anode active material, and a lithium doping amount of 3.5 to 9.0 wt. % based on the total weight of the silicon-based anode active material may provide excellent chemical stability and operational reliability to the lithium secondary battery, as well as enable to manufacture an electrode having excellent uniformity since gas is not generated during preparation of the slurry.

In some embodiments, the silicon-based anode active material may have a silicon crystal grain size of 20 nm or less. If the silicon crystal grain size is 20 nm or less, expansion of the active material may be suppressed when lithium reacts with silicon during charging, thus to improve life-span characteristics of the battery.

In some embodiments, the silicon-based anode active material may include SiOx (x=0.8 to 1.2). When X is 0.8 to 1.2, a ratio of silicon (Si) reacting with lithium and silicon dioxide (SiO$_2$) serving as a buffer for volume expansion becomes 1:0.67 to 1.5, such that the volume expansion may be suppressed while preventing the capacity of the anode active material from being decreased.

In some embodiments, after doping with lithium, the prepared silicon-based anode active material may be washed with a washing solvent. The washing solvent may be any one or more selected from the group consisting of water, an organic solvent and acid. Although it is not particularly limited thereto, for example, the organic solvent may be ethanol, methanol, acetone, hexane, or the like, and the acid may be acetic acid, citric acid, hydrochloric acid, nitric acid, sulfuric acid or the like.

Lithium Secondary Battery

The lithium secondary battery may include an electrode assembly including: a cathode, an anode including the silicon-based anode active material; and a separation membrane interposed between the cathode and the anode. The electrode assembly may be housed and impregnated together with an electrolyte in a case.

The cathode may include a cathode active material layer formed by applying a cathode active material to a cathode current collector. The cathode active material may include a compound capable of reversibly intercalating and deintercalating lithium ions.

In exemplary embodiments, the cathode active material may include a lithium transition metal oxide. For example, the lithium transition metal oxide includes nickel (Ni), and may further include at least one of cobalt (Co) and manganese (Mn).

For example, the lithium-transition metal oxide may be represented by Formula 1 below.

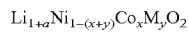 [Formula 1]

In Formula 1, a, x and y may be in a range of $-0.05 \leq a \leq 0.15$, $0.01 \leq x \leq 0.3$, and $0.01 \leq y \leq 0.3$, and M may be at least one element selected from Mn, Mg, Sr, Ba, B, Al, Si, Ti, Zr and W.

A slurry may be prepared by mixing the cathode active material with a binder, a conductive material and/or a dispersant in a solvent, followed by stirring the same.

The slurry may be coated on the cathode current collector, followed by compressing and drying to manufacture the cathode.

The cathode current collector may include, for example, stainless steel, nickel, aluminum, titanium, copper, or an alloy thereof, and preferably includes aluminum or an aluminum alloy.

The binder may be selected from, for example, an organic binder such as vinylidene fluoride-hexafluoropropylene copolymer (PVDF-co-HFP), polyvinylidene fluoride (PVDF), polyacrylonitrile, polymethyl methacrylate, etc., or an aqueous binder such as styrene-butadiene rubber (SBR), and may be used together with a thickener such as carboxymethyl cellulose (CMC).

For example, a PVDF-based binder may be used as a binder for a cathode. In this case, an amount of the binder for forming the cathode active material layer may be reduced and an amount of the cathode active material may be relatively increased, thereby improving the output and capacity of the secondary battery.

The conductive material may be included to facilitate electron transfer between the active material particles. For example, the conductive material may include a carbon-based conductive material such as graphite, carbon black, graphene, or carbon nanotubes and/or a metal-based conductive material such as tin, tin oxide, titanium oxide, or a perovskite material such as LaSrCoO$_3$, and LaSrMnO$_3$.

In some embodiments, the anode may include an anode current collector and an anode active material layer formed by coating the anode current collector with a composition for an anode including the above-described silicon-based anode active material.

In exemplary embodiments, the composition for the anode may be prepared in the form of a slurry by mixing and stirring the silicon-based anode active material and the binder mixture together with a conductive material, a thickener, etc. in a solvent. The slurry may be coated on at least one surface of the anode current collector, followed by compressing and drying to manufacture the anode.

Preferably, the slurry has a viscosity of 3,000 centipoise (cPs) or more. If the viscosity of the slurry is less than 3,000 cPs, the uniformity in the slurry is reduced due to precipitation of the active material, and the coating is not performed uniformly.

In exemplary embodiments, the silicon-based anode active material of the present invention may be mixed with a carbon-based anode active material such as artificial graphite and natural graphite to form an anode. The artificial graphite has relatively superior life-span characteristics compared to the natural graphite, and thereby, it is possible to compensate for a decrease in electrode life-span due to the use of the silicon-based anode active material coated with carbon.

In exemplary embodiments, the binder mixture may include, for example, an acrylic polymer binder and an SBR binder.

In exemplary embodiments, the conductive material may be, for example, a carbon-based conductive material such as carbon black, graphene, carbon nanotubes, etc., and/or a metal-based conductive material such as tin, tin oxide, titanium oxide, or a perovskite material such as $LaSrCoO_3$, and $LaSrMnO_3$.

In exemplary embodiments, the thickener may include, for example, carboxymethyl cellulose (CMC).

In exemplary embodiments, a content of the anode active material may be about 90 to 98 wt. %, a content of the binder mixture may be about 1 to 5 wt. %, a content of the conductive material may be about 0.5 to 5 wt. %, and a content of the thickener may be about 0.5 to 5 wt. % based on a total weight of the slurry.

A separation membrane may be interposed between the cathode and the anode. The separation membrane may include a porous polymer film made of a polyolefin polymer such as ethylene homopolymer, propylene homopolymer, ethylene/butene copolymer, ethylene/hexene copolymer, ethylene/methacrylate copolymer. The separation membrane may include a nonwoven fabric made of glass fiber having a high melting point, polyethylene terephthalate fiber or the like.

In exemplary embodiments, an electrode cell is defined by the cathode, the anode, and the separation membrane, and a plurality of electrode cells are stacked to form, for example, a jelly roll type electrode assembly. For example, the electrode assembly may be formed by winding, laminating, folding, or the like of the separation membrane.

An electrode assembly may be housed together with an electrolyte in an outer case to define the lithium secondary battery. According to exemplary embodiments, a non-aqueous electrolyte may be used as the electrolyte.

The non-aqueous electrolyte includes a lithium salt of an electrolyte and an organic solvent, and the lithium salt is represented by, for example, $Li^+X^-$, and as an anion (X−) of the lithium salt, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, etc. may be exemplified.

As the organic solvent, for example, propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, tetrahydrofurane, and the like may be used. These compounds may be used alone or in combination of two or more thereof.

Electrode tabs (a cathode tab and an anode tab) may protrude from the cathode current collector and the anode current collector, respectively, which belong to each electrode cell, and may extend to one side of the outer case. The electrode tabs may be fused together with the one side of the outer case to form electrode leads (a cathode lead and an anode lead) extending or exposed to an outside of the case.

The lithium secondary battery may be manufactured, for example, in a cylindrical shape using a can, a square shape, a pouch type or a coin shape.

Hereinafter, specific experimental examples are proposed to facilitate understanding of the present invention. However, the following examples are only given for illustrating the present invention and those skilled in the art will obviously understand that various alterations and modifications are possible within the scope and spirit of the present invention. Such alterations and modifications are duly included in the appended claims.

PREPARATIVE EXAMPLE 1

Preparation of Silicon-Based Anode Active Material

A silicon-based anode active material prepared by varying the carbon coating amount, lithium doping amount, and heat treatment temperature.

A surface of a silicon-based anode active material (SiO, Sigma-Aldrich Co.) powder was coated with carbon through thermal CVD treatment at 900° C. using ethylene.

Thereafter, the silicon-based anode active material coated with carbon and lithium hydroxide (LiOH) were mixed and heated, followed by doping with lithium. The silicon-based anode active material doped with lithium was washed using water for 10 minutes to prepare a silicon-based anode active material for a lithium secondary battery.

The carbon coating amount of the prepared silicon-based anode active material was measured using CS Analyzer (CS844) of LECO Co., and the amount of doped lithium was measured by Inductively Coupled Plasma Emission Spectrometer (ICP-OES, Optima 8300) of Perkin-Elmer Co.

Manufacturing conditions of the prepared silicon-based anode active material are shown in Table 1 below.

TABLE 1

| | Carbon coating amount (wt. %) | Lithium doping amount (wt. %) | Heating temperature in lithium doping (° C.) |
|---|---|---|---|
| Example 1 | 3.0 | 7.0 | 700 |
| Example 2 | 5.0 | 4.0 | 700 |
| Example 3 | 5.0 | 4.5 | 700 |
| Comparative Example 1 | 3.0 | 0 | — |
| Comparative Example 2 | 2.5 | 4.5 | 600 |
| Comparative Example 3 | 2.5 | 7.5 | 600 |
| Comparative Example 4 | 2.5 | 9.5 | 600 |
| Comparative Example 5 | 3.0 | 9.0 | 700 |
| Comparative Example 6 | 5.0 | 3.5 | 600 |
| Comparative Example 7 | 5.0 | 5.5 | 700 |

PREPARATIVE EXAMPLE 2

Preparation of Slurry

A slurry for manufacturing an anode was prepared using the silicon-based anode active material prepared according to Preparative Example 1.

An anode slurry was prepared by mixing graphite, the silicon-based anode active material prepared according to Preparative Example 1, carbon nanotubes (CNT) as a conductive agent, carboxymethyl cellulose (CMC) as a binder mixture, and an SBR binder in a ratio of 83.4:13.0:0.1:1.5:2.0 parts by weight.

EXPERIMENTAL EXAMPLE 1

X-ray photoelectron spectroscopy (XPS) (ESCALAB 250Xi of Thermo Scientific Co.) analysis was performed on the silicon-based anode active material prepared according to Preparative Example 1. The XPS analysis was performed using an Al k alpha beam at a voltage of 1486.68 eV with a beam size of 650 μm. The analysis was performed using a CAE mode. Results thereof are shown in Table 2 below.

TABLE 2

| | Presence or absence of gas generation | XPS - Si2p scan area 102.5 | | | |
|---|---|---|---|---|---|
| | | (a) 100 eV peak area | (b) 102.5 eV peak area | (c) 104 eV peak area | eV peak area ratio (%) |
| Example 1 | X | 59 | 252 | 352 | 38% |
| Example 2 | X | 126 | 307 | 437 | 35% |
| Example 3 | X | 67 | 386 | 614 | 36% |
| Comparative Example 1 | X | 320 | 113 | 672 | 10% |
| Comparative Example 2 | ◯ | 191 | 769 | 822 | 43% |
| Comparative Example 3 | ◯ | 38 | 539 | 327 | 60% |
| Comparative Example 4 | ◯ | 125 | 457 | 53 | 72% |
| Comparative Example 5 | ◯ | 15 | 148 | 68 | 64% |
| Comparative Example 6 | ◯ | 46 | 255 | 28 | 78% |
| Comparative Example 7 | ◯ | 31 | 546 | 41 | 88% |

A method of calculating an XPS-Si2p scan area is as follows. After measuring the XPS of the active material, the Si2p spectrum was deconvoluted to calculate areas of the peaks located at 100 eV, 102.5 eV, and 104 eV, respectively. Thereafter, a 102.5 eV peak area ratio was calculated as in Equation 1 below.

$$\text{102.5 eV peak area ratio} = ((b)\ \text{102.5 eV peak area} / ((a)\ \text{100 eV peak area} + (b)\ \text{102.5 eV peak area} + (c)\ \text{104 eV peak area})) \times 100 \quad [\text{Equation 1}]$$

EXPERIMENTAL EXAMPLE 2

The presence or absence of gas generation, pH, and viscosity of the slurry prepared according to Preparative Example 2 were confirmed. Herein, the viscosity of the prepared slurry was measured using a Brookfield viscometer (Spindle type: CZ-52, torque 60-67%, 25.0° C.). The pH was measured at room temperature using a pH meter by putting 1 g of the slurry in 99 g of water, and then stirring for 3 minutes. Results thereof are shown in Table 3 below.

TABLE 3

| | Presence or absence of gas generation | pH | Viscosity (cPs) |
|---|---|---|---|
| Example 1 | X | 10.8 | 5283 |
| Example 2 | X | 8.5 | 5653 |
| Example 3 | X | 10.5 | 5100 |
| Comparative Example 1 | X | 7.0 | 5530 |
| Comparative Example 2 | ◯ | 11.6 | 2175 |
| Comparative Example 3 | ◯ | 11.9 | 1333 |
| Comparative Example 4 | ◯ | 12.3 | 2027 |
| Comparative Example 5 | ◯ | 12.6 | 1250 |
| Comparative Example 6 | ◯ | 10.8 | 2347 |
| Comparative Example 7 | ◯ | 11.7 | 1825 |

From the above results, it can be seen that, in the case of the slurries using the silicon-based anode active materials (Examples 1 to 3) whose 1025 eV peak area ratio is 40% or less in Experimental Example 1, no gas is generated during preparation.

As shown in Table 3 above, when comparing the slurries prepared using the silicon-based anode active materials of Example 1 and Comparative Example 6, respectively, the measured pH of both slurries are equally 10.8. However, it can be seen that no gas is generated in the slurry using the silicon-based anode active material of Example 1, but gas is generated in the slurry using the silicon-based anode active material of Comparative Example 6.

Figure 1B:
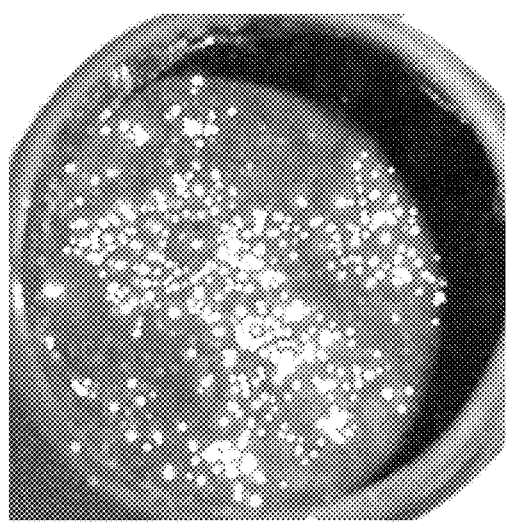

FIGS. 1(a) and 1(b) are photographs showing by comparing states of the slurries of Example 3 (FIG. 1(a)) and Comparative Example 7 (FIG. 1(b)). As shown in FIGS. 1(a) and 1(b), it can be confirmed that only in Comparative Example 7, bubbles due to the gas generation were generated on the surface of the slurry.

In addition, the slurries of Examples 1 to 3 have a viscosity of 5,000 cPs or more, similar to the slurry of Comparative Example 1 using an anode active material not doped with lithium, while the slurries of the other Comparative Examples have a low viscosity of 3,000 cPs or less. In the case of the slurry having a viscosity of 3,000 cPs or less, the uniformity in the slurry may be reduced due to precipitation of the active material, and thus the coating may not be uniformly formed.

EXPERIMENTAL EXAMPLE 3

An anode was prepared using the slurry prepared according to Preparative Example 2. If gas is generated during preparation of a slurry, coating is not performed well on the current collector.

Figure 2A:
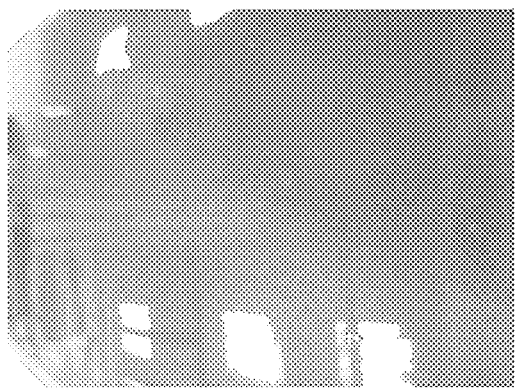
FIGS. 2(a) and 2(b) are photographs showing an electrode according to exemplary embodiments.
Figure 2B:

FIGS. 2(a) and 2(b) are photographs showing a coated electrode in which a copper current collector is coated with the slurries prepared using the silicon-based anode active materials of Example 3 (FIG. 2(a)) and Comparative Example 7 (FIG. 2(b)), respectively. As shown in FIGS. 2(a) and 2(b), in the case of the electrode coated with the slurry of Comparative Example 7, the electrode surface was not uniformly formed due to air bubbles and low viscosity. On the other hand, it can be seen that the electrode surface coated with the slurry of Example 3 (FIG. 2(a)) was uniformly coated.

EXPERIMENTAL EXAMPLE 4

A lithium (Li) coin half-cell was prepared and electrochemical properties such as charge capacity, discharge capacity and initial efficiency were measured.

A lithium coin half-cell was formed by interposing a separation membrane (polyethylene, thickness 20 μm) between the coating electrode (anode) prepared using the slurry of Preparative Example 2 and lithium metal (thickness 2 mm). A combination of lithium metal/separation membrane/anode was placed in a coin cell plate, an electrolyte was injected, and then a cap was covered and clamped. The electrolyte used herein was prepared by dissolving 1M LiPF$_6$ solution in a mixed solvent of EC/FEC/EMC/DEC (20/10/20/50; volume ratio).

After impregnating the prepared lithium coin half-cell for 12 hours or more, charging (CC-CV 0.1C 0.01 V 0.01C CUT-OFF) the cell in a chamber at 25° C., then the battery capacities (charge capacities) were measured, and after discharging again (CC 0.1C 1.5 V CUT-OFF) the same, the battery capacities (discharge capacities) were measured. Initial capacity efficiency of each lithium secondary battery was calculated by dividing the measured initial discharge capacity by the measured initial charge capacity, then multiplying by 100.

The coating electrode prepared by using the slurry of Comparative Example 7 had a non-uniform coating surface, therefore a portion as uniform as possible was selected and proceeded in the same manner. Results thereof are shown in Table 4 below.

TABLE 4

|  | Charge capacity [mAh/g] | Discharge capacity [mAh/g] | Initial efficiency [%] |
| --- | --- | --- | --- |
| Example 3 | 509 | 464 | 91.2% |
| Comparative Example 1 | 533 | 469 | 88.0% |
| Comparative Example 7 | 479 | 436 | 91.0% |

It was found that, in the case of Example 3, compared to Comparative Example 1, the charge capacity and the discharge capacity were somewhat decreased, but the initial efficiency was increased depending on the purpose of lithium doping. In particular, it can be confirmed that a uniform coated electrode may be manufactured without generating gas during preparation of a slurry. In the case of Comparative Example 7, since lithium doping was performed, the initial efficiency was increased similar to Example 3, but both the charge capacity and the discharge capacity were significantly reduced. In particular, in a case of Comparative Example 7, gas is generated during the preparation of the slurry and cannot be uniformly coated on the current collector over a large area, such that it is not suitable for manufacturing a coating electrode having a large area.

What is claimed is:

1. A silicon-based anode active material for a lithium secondary battery comprising a surface coated with carbon and doped with lithium,
   wherein a ratio of a peak area at 102.5 eV to a total area of a peak area at 100 eV, the peak area at 102.5 eV, and a peak area at 104 eV, which appear in an Si2p spectrum when measuring by X-ray photoelectron spectroscopy (XPS), is 40% or less.

2. The silicon-based anode active material for a lithium secondary battery according to claim 1, wherein the carbon is coated in an amount of 2.0 to 5.0% by weight based on a total weight of the silicon-based anode active material.

3. The silicon-based anode active material for a lithium secondary battery according to claim 1, wherein the lithium is doped in an amount of 3.5 to 9.5% by weight based on a total weight of the silicon-based anode active material.

4. The silicon-based anode active material for a lithium secondary battery according to claim 1, wherein the silicon-based anode active material has a silicon crystal grain size of 20 nm or less.

5. The silicon-based anode active material for a lithium secondary battery according to claim 1, wherein the silicon-based anode active material comprises SiOx and x=0.8 to 1.2.

6. A lithium secondary battery comprising:
   a cathode;
   an anode comprising the silicon-based anode active material for a lithium secondary battery according to claim 1; and
   a separation membrane interposed between the cathode and the anode.

* * * * *